Aug. 11, 1959     E. D. DICKINSON     2,898,620
DEVICE FOR CLEANING SOLDERING TIPS
Filed Dec. 31, 1957
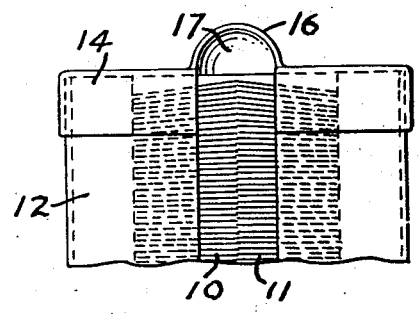
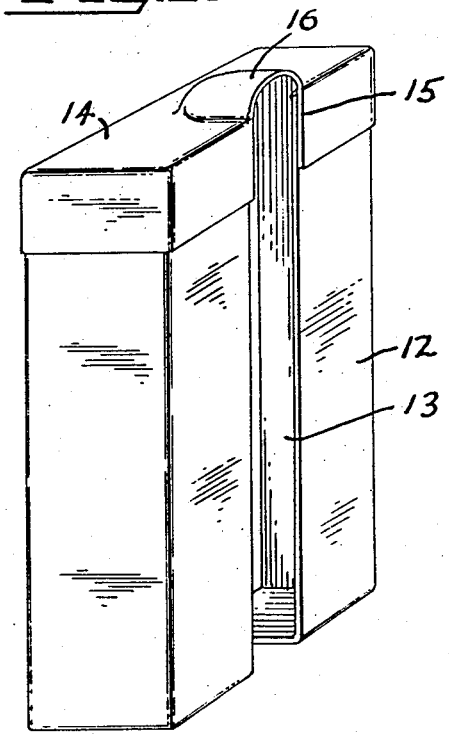
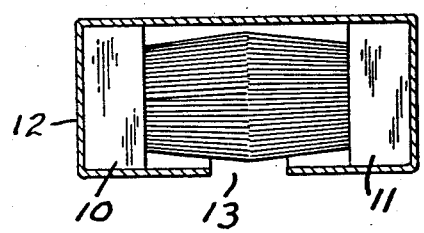
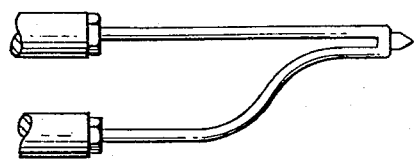
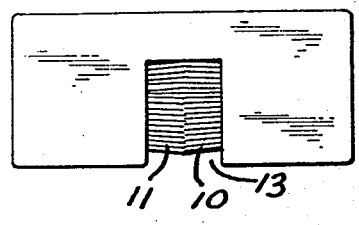
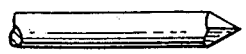
INVENTOR.
EDWARD D DICKINSON
BY
Fryer + Johnson
ATTORNEYS

United States Patent Office 2,898,620
Patented Aug. 11, 1959

2,898,620

DEVICE FOR CLEANING SOLDERING TIPS

Edward D. Dickinson, North Sacramento, Calif.

Application December 31, 1957, Serial No. 706,353

1 Claim. (Cl. 15—160)

This invention relates to devices for cleaning soldering tips.

Soldering tips whether they be of the type employed on electric tools such as soldering guns or tools otherwise heated must be cleaned to assure good "tinning" or an even flow of molten solder over the entire working surface of the tip and a tip upon which dirt or ash or other foreign matter has collected cannot be made to perform satisfactory work.

It is common practice for persons using a soldering tip to wipe it frequently upon a cloth or bit of waste or the like in an endeavor to keep it clean. The cloth or waste rapidly become soiled and ineffective and moreover are unsightly and a nuisance on a work bench.

The present invention provides an improved means for cleaning soldering tips and it is the object of the invention to provide an effective, inexpensive and safe device for accomplishing this end.

Further and more specific objects and advantages of the invention and the manner in which it is carried into practice are made apparent in the following specification wherein reference is made to the accompanying drawings disclosing the invention in a preferred form.

In the drawings:

Fig. 1 is a perspective view of a tip cleaning device constructed in accordance with the present invention with the cleaning brushes removed, Fig. 2 is a view in front elevation of the upper portion only of the device shown in Fig. 1 with the brushes in place, Fig. 3 is a top or plan view of the device with the cover removed, Fig. 4 is a bottom view of the same device, Fig. 5 is a view in side elevation of a conventional soldering tip of the kind employed on electric soldering guns, and Fig. 6 is a similar view of another type of tip.

The invention comprises two vertically supported brushes shown at 10 and 11 in the drawing. These brushes are supported with their bristle end surfaces closely adjacent each other or even in partial contact to enable a soldering tip to be drawn downwardly between them. Since the soldering tip is heated for use at the time that it is cleaned, solder on it is in a fluid state and small particles of solder and foreign matter on the tip may be flipped upwardly by resilient action of the bristles of the brushes. This, of course, presents a hazard to the operator and in order to overcome this hazard, the present invention includes a container shown at 12 which is generally rectangular in form and of a size just sufficient to contain two brushes in the position in which they are to be used as may best be seen in Figs. 2, 3 and 4. The front surface and bottom of the container are provided with a continuous slot 13 through which the tip extends as it is being drawn between the brushes.

The container also has a removable top 14 and this top has a slot 15 in its front end. The forward portion of the top is deformed upwardly as at 16 to provide a space shown at 17 in Fig. 2 just above the meeting bristle faces of the brushes 10 and 11. This space receives the end of a soldering tip, whether it be of the type shown in Fig. 5 or Fig. 6 preparatory to its being drawn downwardly between the brushes 10 and 11.

In use, the container may be held in the hand or secured against a wall in a convenient position and preferably with the bottom unobstructed so that the tip may be drawn through it quickly.

The bristles of the brushes may be of any suitable material either metal or fibre but I have found that fibre bristles are very inexpensive and very durable so long as the hot tip is passed quickly between them.

The particles of solder or other matter that are flipped upwardly, particularly at the upper ends of the brushes where the tip enters between them, are shielded by the top. Because of the space above the brushes, the tip enters between them with a downward motion rather than an inward motion which would tend to cause particles to be flipped outwardly toward the user.

I claim:

A device for cleaning soldering tips which comprises two brushes, a container for holding the brushes with their bristle end faces in substantial contact, and a cover for the top of said container, said cover and container having front walls with registering slots in a position to admit a tip to be drawn between the brushes and the bottom of the container having a contiguous slot through which the tip will leave the container, the top of the cover being imperforate and having an upwardly arched portion registering with the slot in its front wall to provide a space above the brushes to accommodate a tip to be cleaned and to confine spattering material when the tip is moved downwardly between the brushes.

References Cited in the file of this patent

UNITED STATES PATENTS

| | | |
|---|---|---|
| 1,575,733 | Bernstein | Mar. 9, 1926 |
| 1,770,420 | Meyers | July 15, 1930 |
| 1,978,716 | Morehouse | Oct. 30, 1934 |
| 2,237,761 | Leano | Apr. 8, 1941 |
| 2,453,452 | Nielsen | Nov. 9, 1948 |

FOREIGN PATENTS

| | | |
|---|---|---|
| 19,742 | Great Britain | Dec. 31, 1901 |